United States Patent [19]

Minasian et al.

[11] Patent Number: 5,475,505
[45] Date of Patent: Dec. 12, 1995

[54] CANTED PLATEN INPUT SCANNER

[75] Inventors: Philip C. Minasian, Brookline;
Matthew Schreiner, Cambridge, both of Mass.

[73] Assignee: Xerox Corporation, Stamford, Conn.

[21] Appl. No.: 139,347

[22] Filed: Oct. 20, 1993

[51] Int. Cl.$^6$ .................................................. H04N 1/04
[52] U.S. Cl. .......................... 358/474; 358/475; 355/25
[58] Field of Search ............................... 355/25, 75, 76, 355/113, 228, 229, 231, 82, 83; 313/493, 634, 318, 51; 439/49, 602, 612; 358/471, 474, 475, 509; H04N 1/04

[56] References Cited

U.S. PATENT DOCUMENTS

| | | | |
|---|---|---|---|
| Re. 29,067 | 12/1976 | Watson | 178/7.1 |
| 3,726,589 | 4/1973 | Difulvio et al. | 355/64 |
| 3,867,569 | 2/1975 | Watson | 178/7.1 |
| 4,068,950 | 1/1978 | Kito | 355/75 |
| 4,077,714 | 3/1978 | Komori et al. | 355/51 |
| 4,143,960 | 3/1979 | Tracy | 355/3 R |
| 4,321,502 | 3/1982 | Hammer et al. | |
| 4,415,255 | 11/1983 | Huber et al. | 355/3 R |
| 4,427,998 | 1/1984 | Huntoon | 358/294 |
| 4,500,197 | 2/1985 | Dannatt | 355/8 |
| 4,538,185 | 8/1985 | Wiggins | 358/285 |
| 4,547,813 | 10/1985 | McGraw et al. | 358/285 |
| 4,585,334 | 4/1986 | Malyon | 355/25 |
| 4,587,418 | 5/1986 | Shirakoshi et al. | 250/216 |
| 4,630,123 | 12/1986 | Kadomatsu | 358/256 |
| 4,644,159 | 2/1987 | Miura | 250/239 |
| 4,739,159 | 4/1988 | Inokuchi | 250/216 |
| 4,754,485 | 6/1988 | Klatt | 381/52 |
| 4,793,812 | 12/1988 | Sussman et al. | 358/285 |
| 4,812,917 | 3/1989 | Suzuki | 358/293 |
| 4,839,514 | 6/1989 | Mine et al. | 250/237 R |
| 4,845,570 | 7/1989 | Uchiyama | 358/496 |
| 4,926,041 | 5/1990 | Boyd | 250/226 |
| 4,933,753 | 6/1990 | Watanabe | 358/494 |
| 5,012,275 | 4/1991 | Bock | 355/25 |
| 5,041,762 | 8/1991 | Hartai | 313/634 |
| 5,053,819 | 10/1991 | Malyon et al. | 355/75 |
| 5,072,252 | 12/1991 | Howseman, Jr. | 355/75 |
| 5,095,336 | 3/1992 | Corona et al. | 355/229 |
| 5,138,223 | 8/1992 | Osada et al. | 313/493 |

FOREIGN PATENT DOCUMENTS

| | | | |
|---|---|---|---|
| 3546404 | 7/1987 | Germany | G02B 27/02 |
| 2220759 | 12/1992 | United Kingdom | G03B 27/62 |

OTHER PUBLICATIONS

J. Guenther, "Library Copier", Xerox Disclosure Journal, vol. 12, No. 5, Sep./Oct. 1987; pp. 231–232.

V. K. Agarwal, "Book Copying Apparatus", Xerox Disclosure Journal, vol. 9, No. 6, Nov./Dec., 1984, p. 383.

Thompson et al., "Beat Fluorescent Lamp for Bookedge Scanning", Xerox Disclosure Journal, vol. 16, No. 4, Jul./Aug., 1991; pp. 213–214.

Primary Examiner—Kim Yen Vu
Attorney, Agent, or Firm—Mark Costello

[57] ABSTRACT

An input scanner is provided with a housing adapted for support on a level surface, having a first external surface supporting a platen at a first angle with respect to the level surface and a second surface adjacent to the first surface and forming an angle with the first surface forming a book supporting surface; a scanning element supported with the housing for scanning motion past the platen, the scanning element supporting a linear array of photosensitive elements substantially in parallel with the platen, for image acquisition during scanning motion past the platen; and a drive arrangement, coupled to the scanning element, to drive the scanning element in scanning motion. Optionally provided is an adjustable housing support, normally in a first condition supporting the housing in a fashion maintaining the first angle relationship between the platen and the level surface, and adjustable to a second position to bring the platen into a parallel relationship with the level surface.

23 Claims, 6 Drawing Sheets

CANTED PLATEN INPUT SCANNER

CROSS REFERENCE

Cross reference is made to the following application U.S. Ser. No. 29/013,838, filed Oct. 4, 1993, entitled "Reading Machine/Scanner", by P. C. Minasian et al. (assigned to the same assignee as the present application).

This invention relates generally to raster input scanners for acquisition of image information, and more particularly to a raster input scanner having a canted platen adapted to hold a bound document in scanning position.

BACKGROUND OF THE INVENTION

Acquisition of information adaptable for electronic processing applications directly from printed original documents has become greatly desirable as an adjunct to electronic document production. An important reason for its desirability is the subsequent capability of manipulation of the electronically stored information for editing, compiling and using the information in forms other than that in which it was originally available. While such manipulation is, of course, available for image information produced originally and available in an electronic format, it is desirable to have a similar capability for image information not so available. One particular application for such capability is speech reproduction from printed text.

It has become desirable to provide arrangements allowing easier document handling, particularly adapted to applications of input scanners. In the application of speech reproduction from printed text, a particular document handling requirement is the provision of an arrangement which facilitates registration and support of bound documents for scanning. By bound documents, we refer primarily to books, but include other multi-sheet documents which are bound in some manner. Good registration is important, as the OCR capability of such devices provide best results when characters are oriented along the fast or slow scan axis of scanning. Support of bound documents is important so that a user is not required to hold the book in place for scanning and so the document may be scanned without damage to the binding. Additionally, the arrangement should allow the book to be supported so that text in the margins close to the binding is visible and within the depth of field range of the scanner.

Book edges on copying machines, and presumably scanners, are known primarily for the purpose of preventing breaking the binding as it is held open to allow scanning of each page to a position as close to the binding as possible. Generally these arrangements provide a platen supported horizontally with respect to a support surface, with an edge meeting a side wall arranged to allow the book to be draped over the side of the machine. See, for example Xerox Disclosure Journal, "Book Copying Apparatus", by V. Agarawal, Vol. 9, No. 6, November/December, 1984, p. 383, which also provides an arrangement for scanning the draped face of the book. While some arrangements provide for support of the scanned page of the bound volume at 90° with respect to the facing page, others accommodate a larger angle. To this end, GB-B 2,220,759 shows just such an arrangement, deemed gentler on the binding, and also includes an additional ridge support extending into the binding for support. DE-A 1 3546404 shows a roof-shaped supporting book support apparatus in a copier application. This provides good support, but complex optics in the copier arrangement.

Other book supporting arrangements in copying applications include U.S. Pat. No. 4,585,334 to Malyon, U.S. Pat. No. 3,726,589 to Difulvio et al., U.S. Pat. No. 4,068,950 to Kito, U.S. Pat. No. 4,077,714 to Komori et al., U.S. Pat. No. 4,415,255 to Huber et al., and U.S. Pat. No. 4,143,960 to Tracy.

Flat bed scanners of the type contemplated for use in association with this invention are well characterized, by, for example U.S. Pat. No. 4,839,514 to Mine et al., U.S. Pat. No. 3,867,569 (Re. 29,067) to Watson; U.S. Pat. No. 4,644,159 to Miura; U.S. Pat. No. 4,587,418 to Shirakoshi et al.; U.S. Pat. No. 4,739,159 to Inokuchi et al.; U.S. Pat. No. 4,812,917 to Suzuki; U.S. Pat. No. 4,845,570 to Uchiyama; U.S. Pat. No. 4,427,998 to Huntoon; U.S. Pat. No. 4,538,185 to Wiggins; U.S. Pat. No. 4,500,197 to Dannatt, U.S. Pat. No. 4,547,813 to McGraw et al., U.S. Pat. No. 4,926,041 to Boyd, and U.S. Pat. No. 4,630,123 to Kadomatsu.

L-shaped fluorescent lamps for book edge scanning are known for optimizing response at a book edge, as shown in Xerox Disclosure Journal, Vol. 16, No. 4, July/August 1991, pages 213 and 214.

All the patents and publications cited hereinabove are incorporated herein by reference.

SUMMARY OF THE INVENTION

In accordance with the invention, in an electronic input scanner a platen arrangement is provided to independently support and register bound documents or books.

In accordance with the invention, an input scanner is provided with a housing adapted for support on a level surface, having a first external upper surface supporting a platen at a first angle with respect to the level surface and a second surface adjacent to the first surface and forming an oblique angle therewith, the first and second surface in combination forming a book supporting surface supporting at least one sheet in a book in scanning relationship with the platen; a scanning element supported with the housing for scanning motion past the platen, the scanning element supporting a linear array of photosensitive elements substantially in parallel with the platen, for image acquisition during scanning motion past the platen; and a drive arrangement, coupled to the scanning element, to drive the scanning element in scanning motion.

In accordance with another aspect of the invention, there is provided adjustable support means coupled to the housing, normally in a first condition supporting the housing in a fashion maintaining the first angle relationship between the platen and the level surface, and adjustable to a second position to bring the platen into a parallel relationship with the level surface.

The scanning platen in the present invention is canted or arranged at an angle with respect to horizontal, and in combination with the second surface, forms a book supporting arrangement which maintains books in scanning position and registration during scanning. To simplify the optical arrangement required for imaging the face of a book on the platen, the scanning element supports the photosensitive array for scanning movement substantially parallel to the platen. An additional embodiment of the invention provides adjustable support elements on the housing, which, while normally supporting the housing in book scanning position, are adjustable to support the housing in a document scanning position with the platen parallel to the support surface.

In accordance with yet another aspect of the invention, U- and $\Omega$-shaped lamps allows tight book edge response with non-contact-type imaging arrangements.

Other objects and advantages will become apparent from the following description taken together with the drawings in which:

FIG. 2A is a cutaway side view showing an input scanner incorporating the present invention, in use; while

Figure 1:
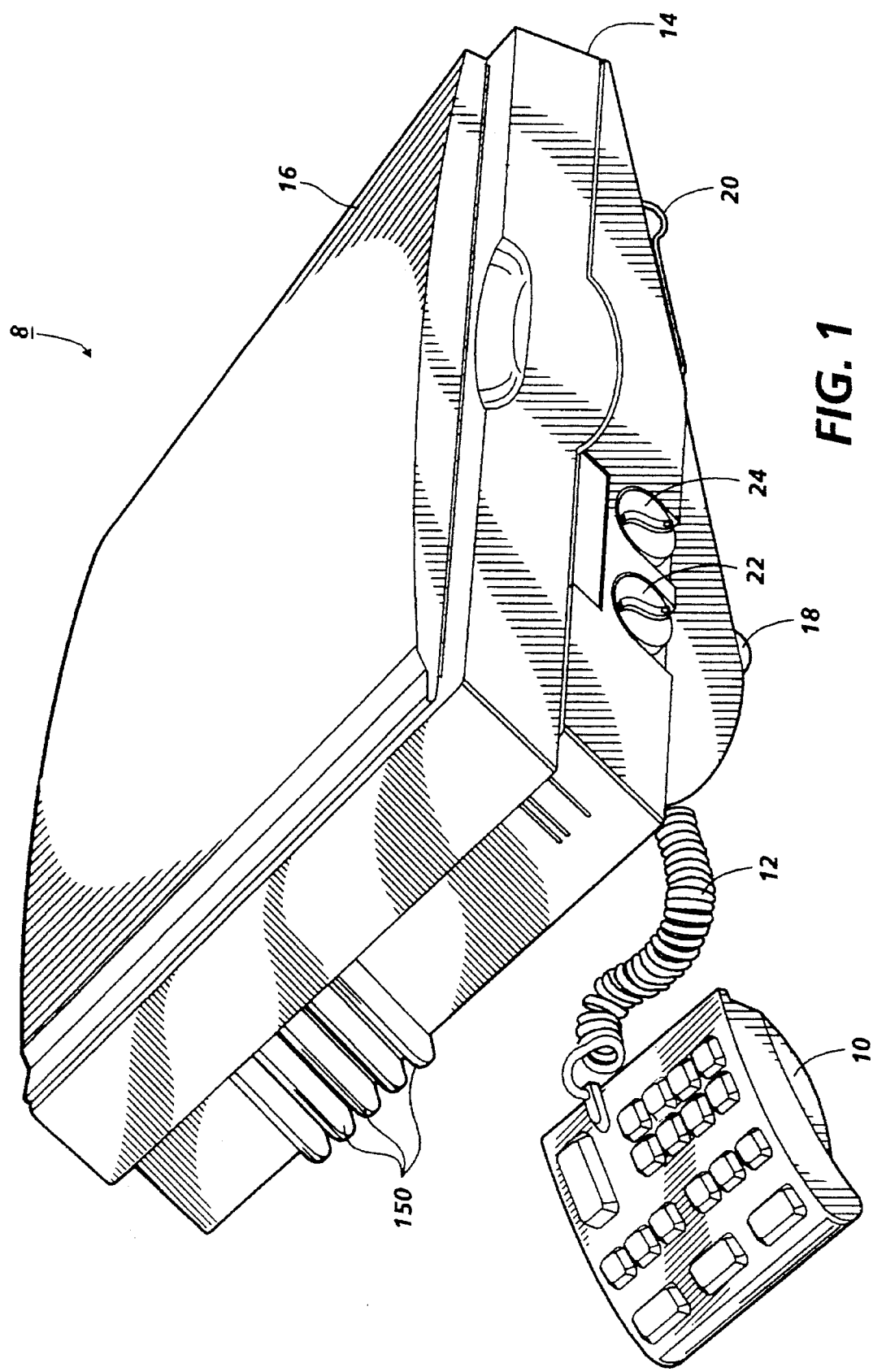
FIG. 1 is a perspective view of an input scanner device incorporating the present invention.

Referring now to the drawings where the showings are for the purpose of illustrating a preferred embodiment of the invention and not for limiting same, FIG. 1 shows an input scanner 8 in accordance with the invention for generating an electronic representation of an image on a document and a sound reproduction of intelligible language therefrom. It will be recognized that while the description refers to an integral reading machine, the invention has broad application to image scanners. As used hereinafter, "document" refers to an image bearing original from which copying is desired. Documents may comprise image supporting substrates, such as cut sheets of paper, transparencies or other individual pieces of flimsy material, unburst computer forms forming a continuous length of material, or any image bearing substrate from which copying is desired. The present invention is most particularly concerned with "bound documents", or "books", which include a plurality of sheets in a logical sequence. When opened, bound documents have a pair of "faces" or facing pages, both of which may have images thereon. Usually, although not universally, the text and images on each page are oriented from top to bottom along an axis parallel to a binding of the bound document. The "binding" refers to the arrangement by which the sheets forming the bound document are held together. "Image" as used herein, refers to the visible information on the document, for which scanning is desired, and which will be in some manner copied to another substrate or to an electronic storage medium. "Scanning"0 as used hereinafter, refers to the relative movement of photosensitive sensors with respect to documents for the purpose of acquiring an electronic representation of the image or information about the image.

With reference now to FIG. 1, the Xerox Imaging System "THE READING EDGE" reading machine is shown, announced to the public on Oct. 22, 1992. It incorporates a scanner housing and control panel. Internal to the device and not visible in FIG. 1 are associated electronics for imaging and data processing including image processing for optimally acquiring a bitmap, optical character recognition (OCR) for converting the bitmap to ascii signals and speech reproduction for converting the ascii signals to speech signals, and speakers for providing sound. Earlier versions of this type of device have been discussed at U.S. Pat. No. 4,793,812 to Sussman et al., which discloses a device with similar functionality but using a hand held scanning device. Text to speech processing for speech reproduction purposes is described at U.S. Pat. No. 4,754,485 to Klatt.

Accordingly, a user interface 10 is provided for operational control of the device 8, connected thereto via connector cable 12. Scanner frame 14 is a molded plastic member which supports scanner hardware and associated electronics. A platen cover 16 is provided for holding documents in place and providing a black or other background backing for scanning operations. Conveniently, platen cover 16 may be connected to frame 14 by articulating hinges (not shown) which allow it to be closed over books of some thickness, and also closed flat over single page documents. Also shown in FIG. 1 are front and rear support members 18 and 20 (which have unillustrated counterparts at the rearward end of the machine which is not visible in FIG. 1), which serve to support the frame and prevent marring of furniture, but also provide conversion of the canted platen scanner to an uncanted platen scanner, as will be described hereinafter. Knobs 22 and 24 provide volume and speed control of the speech features of the device.

Figure 2A:
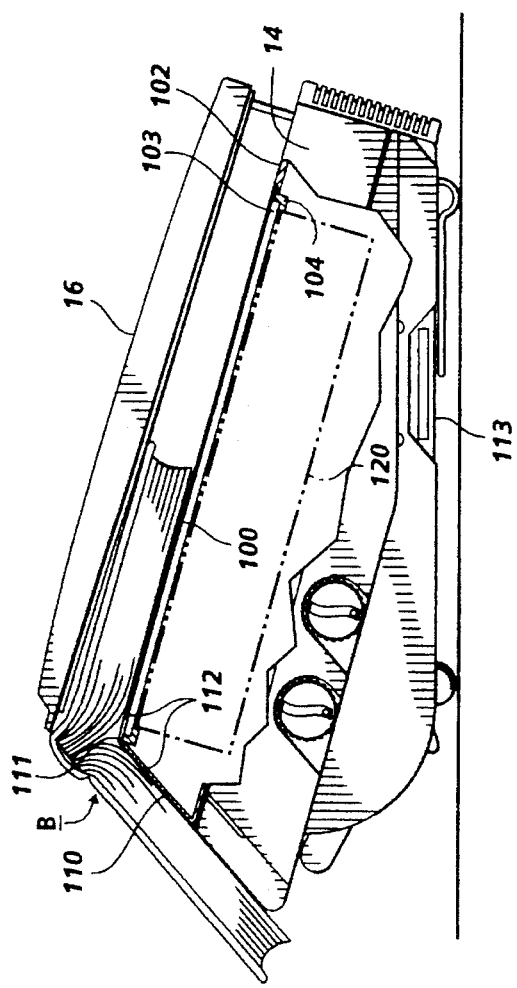

FIG. 2A is a cutaway view of the image scanner, with only pertinent elements shown. Accordingly, illustrated is book or bound document B supported for scanning. One face of book B is supported on, or in superposed relationship, with scanning platen 100, which is supported on upper surface 102 of the generally enclosed scanner housing 14. Scanning platen 100 is typically transparent glass, which may have an anti-glare coating. Upper surface 102 has an aperture opening 103 formed therein to accommodate platen 100 and may be conveniently provided with support ledges 104 partially or completely surrounding the opening and holding platen 100 in position. A second face of book B is supported on second surface 110 of housing 14, located adjacent to and having a common edge 111 with upper surface 102. Together the upper and second surface form a book supporting surface 112 which will be described in further detail with respect to FIG. 2A. Desirably, platen 100 is located as close as mechanically possible to common edge 111 with upper surface 102 to allow scanning as deep into the binding area as possible. The entire housing is supported on a base 113 providing a lower surface to the scanner housing. Supported within housing 14, scanning assembly 120 supports a moving optics arrangement for scanning movement across and underneath platen 100 for the purpose of acquiring image information, that will be described further hereinafter. Platen cover 16 is shown in its articulated position over one side of book B. Its weight is therefore combined with the weight of scanned side of book B to hold the book in position. Conveniently, platen cover 16 has a size selected to completely cover the platen when closed. It has been determined that desirably, the second surface 110 has a length corresponding to the width of the book page. In the embodiment shown in FIG. 1, the length of second surface 110 is extended by the provision of fins or teeth 150, which have a book supporting surface coplanar with the second surface 110. The teeth 150 provide this function without requiring the excessive bulk that might otherwise be provided if face 110 extended to join base.

In considering the relationship of upper surface 102 and surface 110 for optimal book scanning, several factors are considered, including 1) preventing damage to the binding of the book; 2) illuminating and scanning the binding region; 3) supporting of the book; and 4) providing suitable volumetric packaging, industrial design, and human factors packaging.

Figure 2B:
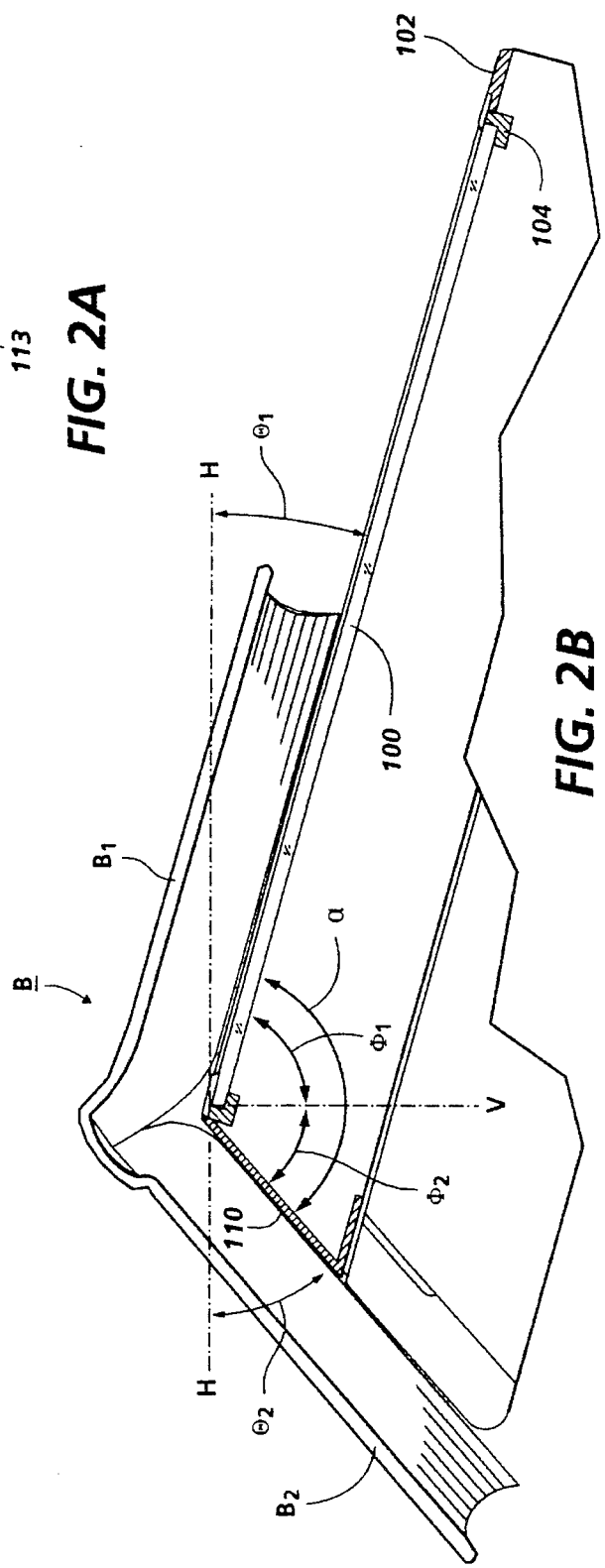
FIG. 2B is a breakaway illustration showing certain details of the arrangement.

With reference now to FIG. 2B and in accordance with the invention, upper surface 102 supports platen 100 and accordingly a first face $B_1$ of book B at an angle $\Theta 1$ with respect to the horizontal, while surface 110 supports a second face $B_2$ of book B at a second angle $\Theta 2$. It is initially noted that angle α (approximately the angle defined between two faces when the book is opened) is at most 120°–150° before ruining the book binding and/or pushing the book too far away from the scanner's book edge at the book's margin. To obtain the best illumination of the binding portion of book B, angle α should be kept small, although angle α cannot become too small to maintain a suitable volume for this particular type of optical scanning, i.e., scanning with a compact optical head with non-contact type CCD and with fluorescent lamp for illumination. Ideally, for support of the book, angle $\Phi_1$ between the first book face and the vertical V and $\Phi_2$ the angle between the second book face and the vertical are equal $\Phi_{1=\Phi 2}$ and so in practical embodiment:

$$90° < \Phi_{1+\Phi 2} < 150°$$

Furthermore, practically speaking, $\Phi_1$ or $\Phi_2$ both should always each be less than 85° and greater than 45°. In a preferred embodiment, measuring from the vertical V, $$\Phi_1 = 75° \text{ and } \Phi_2 = 45°$$

These angles ($\Phi_1$ and $\Phi_2$) are selected to provide support of a wide range of book sizes that both hold the book and allow the area adjacent the binding to be visible and within the depth of field of the scanner. The arrangement appears to work well irrespective of the number of pages at one face or the other. While the embodiment shown illustrates the platen and the upper surface in a coplanar relationship, this is not necessarily the case.

Figure 3:
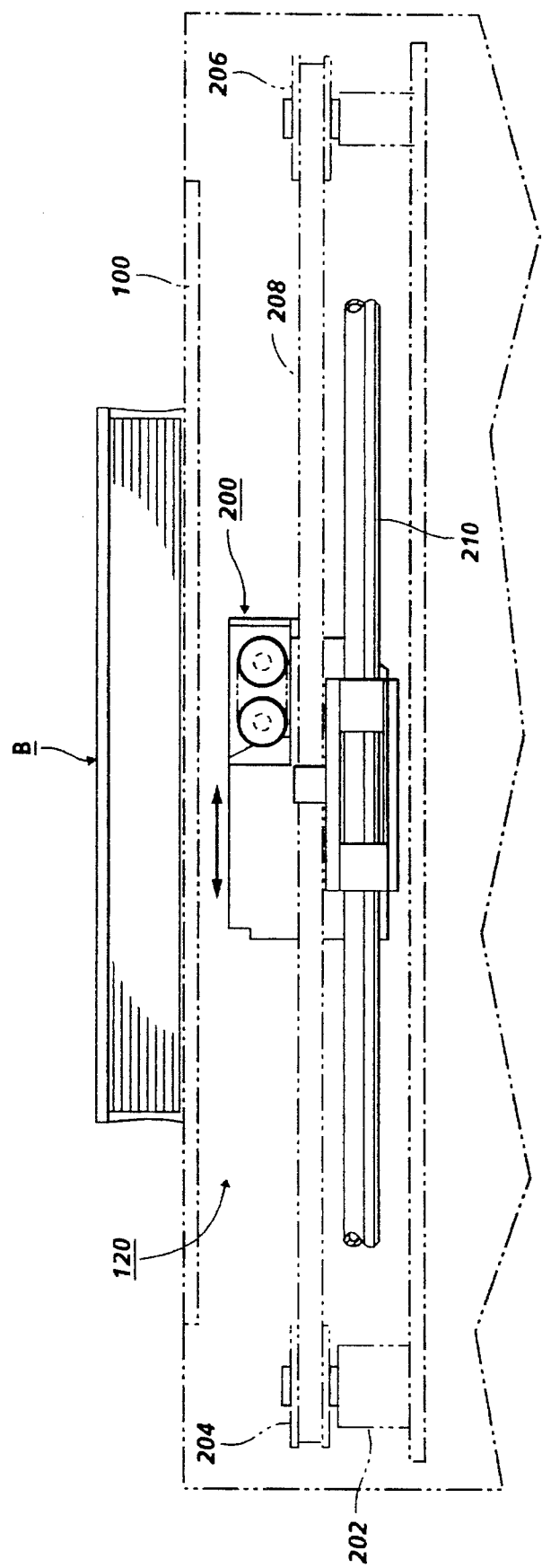
FIG. 3 shows the scanning element and a drive arrangement to move the scanning element in scanning motion.

With reference now to FIG. 3, scanning assembly 120 includes a scanning element 200 including optics and electronics for acquiring an image, a drive motor 202, and a driving arrangement including pulleys 204, 206 and belt 208. To that end, drive motor 202 rotates drive pulley 204, with drive belt 208 wrapped therearound. Drive belt 208 is also wrapped around idler pulley 206 and is fixedly connected to scanning element 200. As drive motor 202 rotates drive pulley 204 in first and second directions, scanning element 200 is driven in scanning movement across and underneath platen 100, supported on rail 210. Rail 210, and pulleys 202 and 204 are mounted on housing 14. Of course, other drive arrangements including, for example, a lead screw drive or a full rate half rate carriage are possible.

Figure 4:
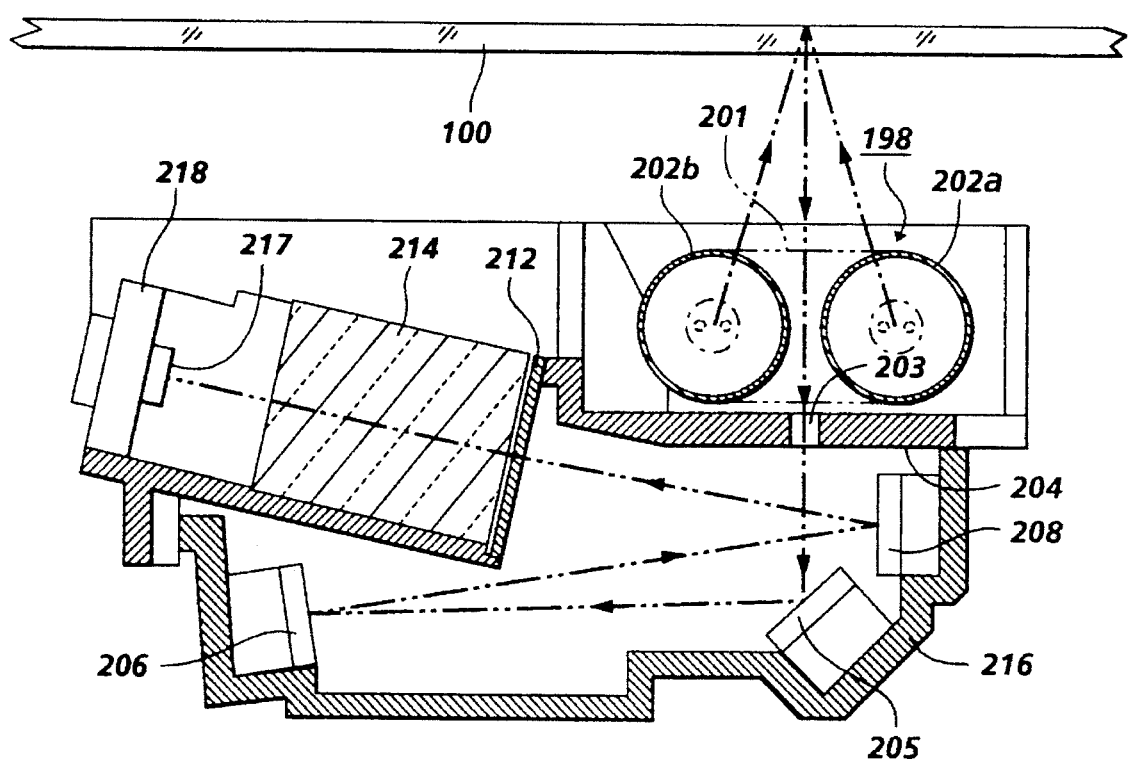
FIG. 4 illustrates a cutaway side view of the optical arrangement within the scanning element.
Figure 6A:
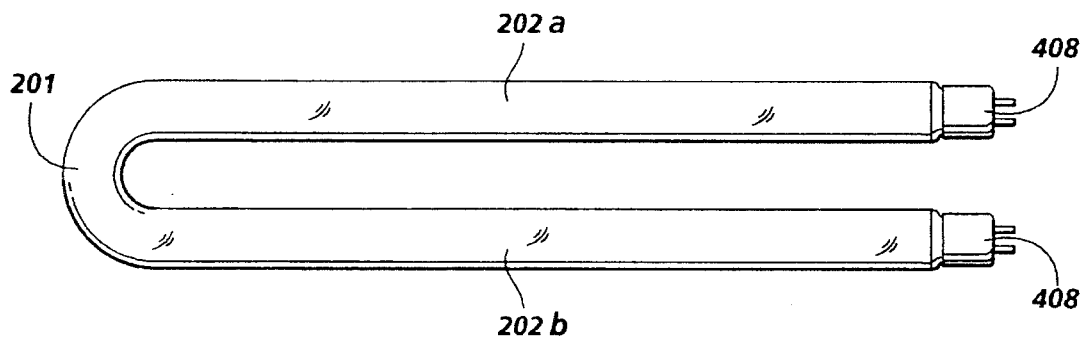
FIG. 6A shows a U-shaped illumination lamp.
Figure 6B:
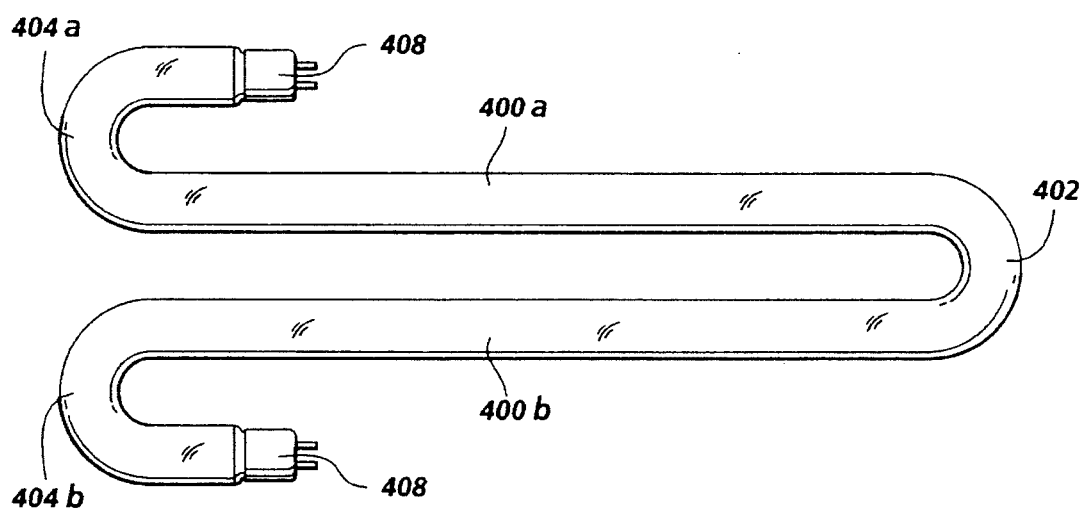
FIG. 6B shows an Ω-shaped illumination lamp [omega-shaped].

FIG. 4 shows the image acquisition portion of the scanning element 200 in cross section. Generally, this assembly includes lamp 198, which illuminates the image. With additional reference to FIG. 6A, lamp 198 is desirably a U-shaped lamp in which the joining portion 201 of legs 202a and 202b of the U is located adjacent to the binding to provide illumination in the binding area. A U-shaped lamp offers significant benefits specific to book edge scanners: (a) it increases illumination at the bookedge, and (b) it can fit very tightly into the bookedge. Alternatively, with reference to FIG. 68, an Ω-shaped lamp [omega-shaped] may be provided. The Ω-shape provides a pair of legs 400a, 400b perpendicular to the scanning direction, a joining portion 402, away from the book edge and a pair of wings 404a and 404b which provide illumination at the book edge. This design improves on the U-shape in that the tube itself does not interfere with imaging up the edge 111. Both the U- and Ω-shaped lamps allow tight book edge response with non-contact-type CCDs. Both lamps provide electrical connections 408 away from the book edge Alternatively, an LED array can be used with contact-type CCDs and SELFOC-type lenses.

Light reflected from the document passes through aperture 203 formed in scanning element upper housing 204 to an optical path formed by first mirror 205, second mirror 206 and third mirror 208, all supported on scanning element lower housing 216, through shading correction aperture 212 to lens 214 supported on upper housing 204, and to scanning array 217 on PWB 218 supporting other imaging electronics. It will, of course, be recognized that the invention requires that the image acquisition arrangement accurately form an image. This may be done in a moving sensor array arrangement by causing the scanning array to move in parallel with the platen. However, the transport assembly need not be mounted in parallel with the platen if the sensor array can be held in such a relationship.

Figure 5A:
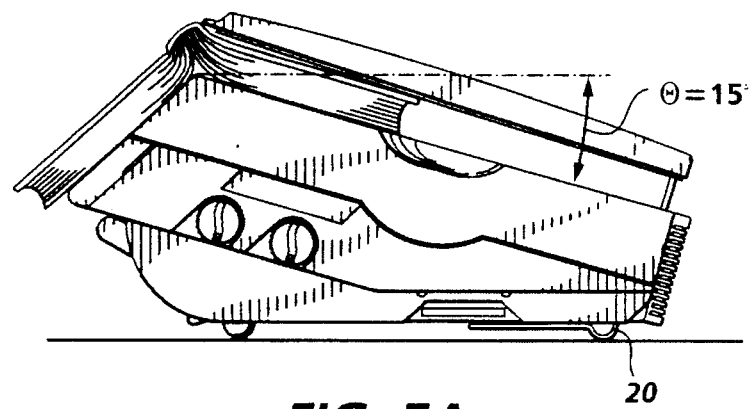
FIG. 5A is a simplified side view that illustrates the adjustable support member in normal condition.
Figure 5B:
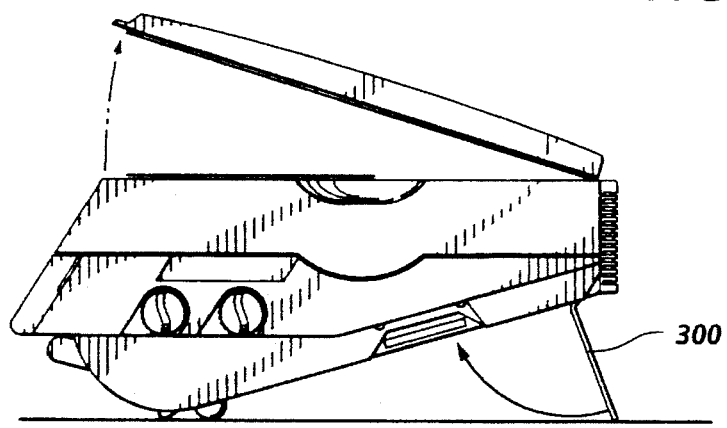
FIG. 5B shows the adjustable support member in extended condition to support the scanning platen in a second condition.
Figure 5C:
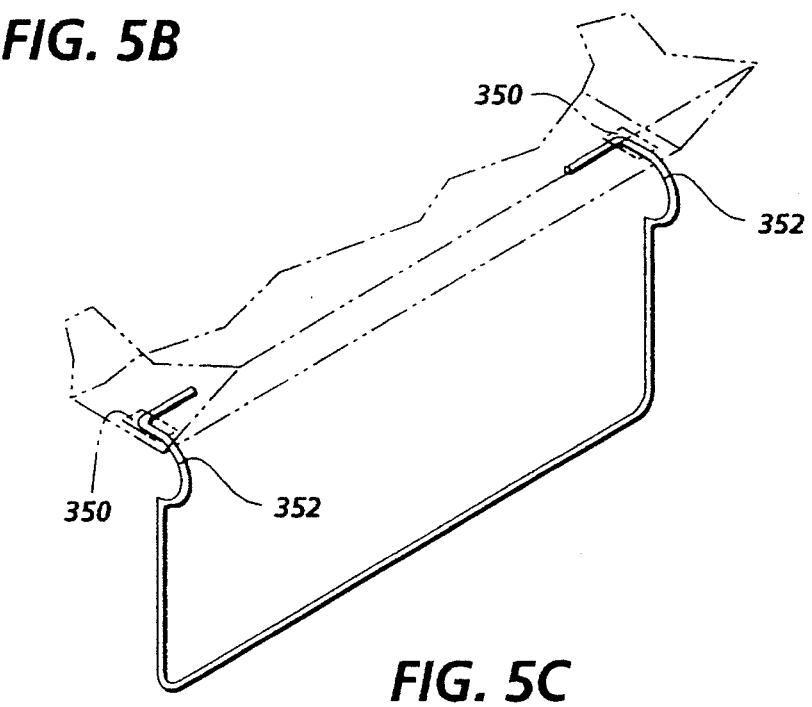
FIG. 5C. shows the support member used.

In accordance with another aspect of the invention, it has been found that while the canted scanning platen works well to support books, there are classes of documents which are better supported by a horizontal platen. Accordingly and with reference to FIGS. 5A and 5B, rear support legs 20 together form an arrangement for lifting one end of the scanner housing to bring the platen into parallel with the horizontal. FIG. 5A shows the arrangement with the rear leg assembly in a closed position, while FIG. 5B shows the rear leg assembly opened. As seen in FIG. 5C, rear leg assembly 20 is a stiff wire assembly, mounted for pivotal motion through a complementary receiving opening 350 in the bottom surface 300 of housing 14. A hinging arrangement provides for stop or detent 352 formed in the leg assembly 20 to provide a fixed position stopping location for the rear leg when assembled.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. An input scanner comprising:

a generally enclosed housing having an exterior upper surface, an exterior second surface adjacent to the upper surface having a common edge with the upper surface, and a base upon which the housing is supported;

a platen supported on the upper surface, having an edge closely adjacent to the common edge, the platen supported at a first non-horizontal angle with respect to horizontal, on which a sheet to be scanned may be placed;

said second surface arranged at an oblique angle with respect to said platen, and together with said platen forming a book supporting surface for a book with at least one sheet therein over the platen;

a scanning arrangement supported within said housing and having a scanning element, supported for scanning movement parallel to, across and below the platen surface supporting a sheet to be scanned for the acquisition of image information from the sheet supported thereon, said scanning element supporting an array of photosensitive elements parallel to said platen surface supporting a sheet to be scanned during scanning movement thereof, said array of photosensitive elements deriving a digital electronic bitmap image of an image of the sheet;

a driving arrangement connected to said scanning arrangement and operative to cause scanning movement thereof along a predetermined scanning path.

2. The input scanner as defined in claim 1 wherein said base has coupled thereto at least one support member adjustable to increase in height to support the housing so that a second edge of the upper surface of the housing, parallel to the common edge, is brought to a position where the upper surface supports the platen horizontally.

3. The input scanner as defined in claim 1 wherein said scanning element is moved along a scanning path while in parallel relationship to said platen.

4. The input scanner as defined in claim 1 wherein the scanner housing additionally has a pair of generally parallel side surfaces and a rear surface, the side surfaces and the rear surface joining the base and the upper surface.

5. The input scanner as defined in claim 4 wherein the scanner housing is provided with a front surface joining the second surface and the base, said front surface arranged at an angle with respect to said second surface, and the combined vertical height of said front surface and said second surface from said base to said upper surface is greater than the height of the rear surface from said base to said upper surface.

6. The input scanner as defined in claim 1 wherein said upper surface is substantially planar and substantially coplanar with said platen.

7. The input scanner as defined in claim 6 wherein said first non-horizontal angle is approximately 15 degrees below the horizontal.

8. The input scanner as defined in claim 1 wherein said second surface is arranged at an angle of 45 degrees below the horizontal.

9. The input scanner as defined in claim 8 wherein the book supporting surface formed by the platen and second surface supports the book for scanning in an opened condition, with the book opened at an angle of about 120 degrees.

10. The input scanner as defined in claim 1, wherein measuring to a common vertical, angle $\Phi_1$ from the upper surface to the vertical and $\Phi_2$ from the second face to the vertical are defined by the relationships:

$90°<\Phi_{1+\Phi2}<150°$ and $45°<\Phi_1<85°$, and $45°<\Phi_2<85°$.

11. The input scanner as defined in claim 1, wherein said scanning arrangement includes a U-shaped lamp, for illuminating documents supported on said platen during scanning, said lamp having a pair of generally parallel legs, each having electrical connectors at distal ends thereof and connected by a joining portion, said lamp supported for scanning movement with said scanning element, with the joining portion arranged adjacent to said common edge, for illumination of a portion of the document placed adjacent thereto.

12. The input scanner as defined in claim 1, wherein said scanning arrangement includes an $\Omega$-shaped lamp, for illuminating documents supported on said platen during scanning, said lamp having a pair of generally parallel legs, each leg having an illumination wing extending in along the path of scanning motions and having electrical connectors at distal ends thereof, each of the generally parallel legs connected by a joining portion, said lamp supported for scanning movement with said scanning element, with the illumination wings arranged adjacent to said common edge, for illumination of a portion of the document placed adjacent thereto.

13. An input scanner operable in first and second modes, the first mode providing an arrangement optimally supporting bound documents and the second mode providing an arrangement optimally supporting single sheets documents, and comprising:

a generally enclosed housing having an exterior upper surface, an exterior second surface adjacent to the upper surface having a common edge with the upper surface, and a base upon which the housing is supported;

a platen supported on the upper surface, having an edge closely adjacent to the common edge, the platen supported at a first non-horizontal angle with respect to horizontal;

said second surface arranged at an oblique angle with respect to said platen, and together with said platen forming a book supporting surface for a book with at least one sheet therein over the platen;

a scanning arrangement supported within said housing and having a scanning element, supported for scanning movement past the platen for the acquisition of image information from the sheet supported thereon, said scanning element supporting an array of photosensitive elements parallel to said platen during scanning movement thereof;

a driving arrangement connected to said scanning arrangement and operative to cause scanning movement thereof along a predetermined scanning path;

at least one support member coupled to said base and adjustable to increase in height to support the housing so that a second edge of the upper surface of the housing, parallel to the common edge, is brought to a position where the upper surface supports the platen horizontally.

14. The input scanner as defined in claim 13 wherein said scanning element is moved along a scanning path while in parallel relationship to said platen.

15. The input scanner as defined in claim 13 wherein the scanner housing additionally has a pair of generally parallel side surfaces and a rear surface, the side surfaces and the rear surface joining the base and the upper surface.

16. The input scanner as defined in claim 15 the scanner housing is provided with a front surface joining the second surface and the base, said front surface arranged at an angle with respect to said second surface, and the combined vertical height of said front surface and said second surface from said base to said upper surface is greater than the height of the rear surface from said base to said upper surface.

17. The input scanner as defined in claim 13 wherein said upper surface is substantially planar and substantially coplanar with said platen.

18. The input scanner as defined in claim 17 wherein said first non-horizontal angle is approximately 15 degrees below the horizontal.

19. The input scanner as defined in claim 13 wherein said second surface is arranged at an angle of 45 degrees below the horizontal.

20. The input scanner as defined in claim 19 wherein the book supporting surface formed by the platen and second surface supports the book for scanning in an opened condition, with the book opened at an angle of about 120 degrees.

21. The input scanner as defined in claim 20 wherein measuring to a common vertical, angle $\Phi_1$ from the upper surface to the vertical and $\Phi_2$ from the second face to the vertical are defined by the relationships:

$90°<\Phi_{1+\Phi2}<150°$ and $45°< \Phi_{1<85}°$, and $45°<\Phi_2<85°$.

22. The input scanner as defined in claim 13, wherein said scanning arrangement includes a U-shaped lamp, for illuminating documents supported on said platen during scanning, said lamp having a pair of generally parallel legs, each having electrical connectors at distal ends thereof and connected by a joining portion, said lamp supported for scanning movement with said scanning element, with the joining portion arranged adjacent to said common edge, for illumination of a portion of the document placed adjacent thereto.

23. The input scanner as defined in claim 13, wherein said scanning arrangement includes an Ω-shaped lamp, for illuminating documents supported on said platen during scanning, said lamp having a pair of generally parallel legs, each leg having an illumination wing extending in along the path of scanning motions and having electrical connectors at distal ends thereof, each of the generally parallel legs connected by a joining portion, said lamp supported for scanning movement with said scanning element, with the illumination wings arranged adjacent to said common edge, for illumination of a portion of the document placed adjacent thereto.

* * * * *